US008522102B2

(12) United States Patent  
Chang et al.

(10) Patent No.: US 8,522,102 B2  
(45) Date of Patent: Aug. 27, 2013

(54) APPARATUS AND METHOD FOR ARQ FEEDBACK POLLING IN WIRELESS COMMUNICATION SYSTEM

(75) Inventors: Young-Bin Chang, Anyang-si (KR); Taori Rakesh, Suwon-si (KR); Jung-Je Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 12/732,625

(22) Filed: Mar. 26, 2010

(65) Prior Publication Data  
US 2010/0251081 A1 Sep. 30, 2010

(30) Foreign Application Priority Data  
Mar. 27, 2009 (KR) .................. 10-2009-0026605  
Dec. 24, 2009 (KR) .................. 10-2009-0130486

(51) Int. Cl.  
*H04L 1/18* (2006.01)

(52) U.S. Cl.  
USPC ........... 714/748; 714/749; 370/280; 370/346; 370/449; 370/347; 370/331; 455/39; 375/295

(58) Field of Classification Search  
None  
See application file for complete search history.

(56) References Cited

U.S. PATENT DOCUMENTS

| 5,970,063 | A  | * | 10/1999 | Chapman et al. | ............. 370/346 |
| 2003/0099305 | A1 | * | 5/2003 | Yi et al. | ........................ 375/295 |
| 2003/0202501 | A1 | * | 10/2003 | Jang | ............................... 370/346 |
| 2006/0062323 | A1 | * | 3/2006 | Yi et al. | ........................ 375/295 |
| 2006/0140166 | A1 | * | 6/2006 | Albulet | ......................... 370/346 |
| 2006/0154603 | A1 | * | 7/2006 | Sachs et al. | ..................... 455/39 |
| 2009/0028126 | A1 | * | 1/2009 | Meylan | .......................... 370/346 |
| 2009/0103512 | A1 | * | 4/2009 | Chun et al. | .................... 370/346 |
| 2010/0085880 | A1 | * | 4/2010 | Torsner et al. | ................ 370/252 |
| 2010/0205500 | A1 | * | 8/2010 | Lee et al. | ....................... 714/748 |
| 2010/0238915 | A1 | * | 9/2010 | Cayla et al. | ................... 370/346 |

FOREIGN PATENT DOCUMENTS

| KR | 10-2005-0021234 A | 3/2005 |
| KR | 10-2006-0092955 A | 8/2006 |
| KR | 10-2007-0048438 A | 5/2007 |
| KR | 10-2007-0115377 A | 12/2007 |

* cited by examiner

*Primary Examiner* — John Trimmings  
(74) *Attorney, Agent, or Firm* — Jefferson IP Law, LLP

(57) ABSTRACT

An apparatus and method for Automatic Repeat reQuest (ARQ) feedback polling in a wireless communication system are provided. The method for ARQ feedback polling includes transmitting at least one ARQ block to a receive end, polling ARQ feedback to the receive end using an extended header, determining if ARQ feedback information is received from the receive end within a lifetime of ARQ feedback, determining success or failure of transmission of the at least one ARQ block through the ARQ feedback information if it is determined that the ARQ feedback information is received within the lifetime of ARQ feedback, and polling ARQ feedback again to the receive end if it is determined that the ARQ feedback information is not received within the lifetime of ARQ feedback.

20 Claims, 10 Drawing Sheets

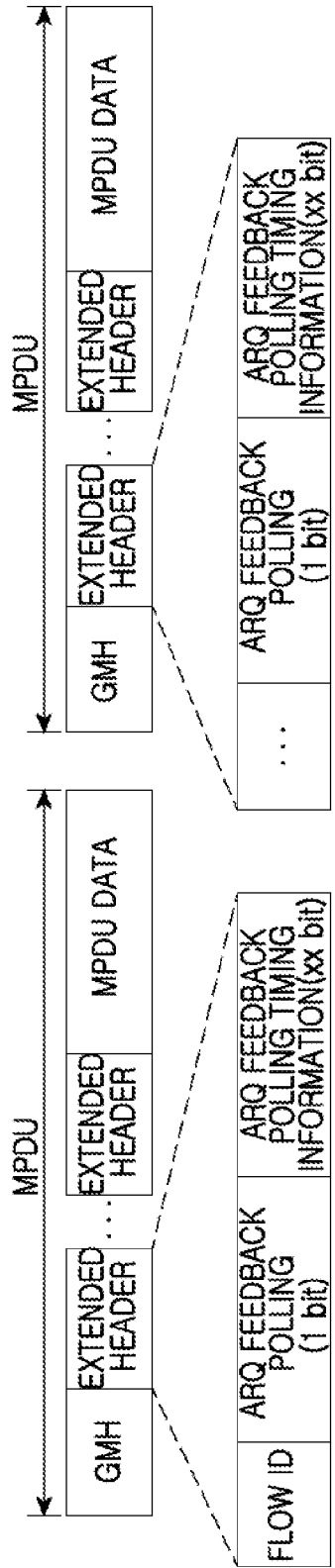
FIG.8A
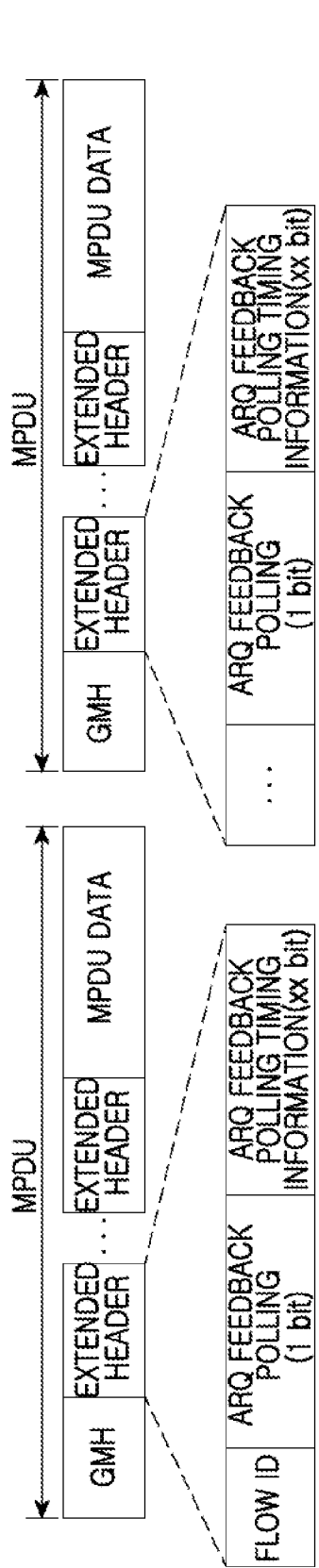
FIG.8B
FIG.8C
FIG.8D

APPARATUS AND METHOD FOR ARQ FEEDBACK POLLING IN WIRELESS COMMUNICATION SYSTEM

PRIORITY

This application claims the benefit under 35 U.S.C. §119 (a) of a Korean patent application filed in the Korean Intellectual Property Office on Mar. 27, 2009 and assigned Serial No. 10-2009-0026605, and a Korean patent application filed in the Korean Intellectual Property Office on Dec. 24, 2009 and assigned Serial No. 10-2009-0130486, the entire disclosures of both of which are hereby incorporated by reference.

BACKGROUND OF THE INVENTION

1. Field of the Invention

The present invention relates to an apparatus and method for Automatic Repeat reQuest (ARQ) in a wireless communication system. More particularly, the present invention relates to an apparatus and method for ARQ feedback polling to a receive end in a transmit end of a wireless communication system.

2. Description of the Related Art

Wireless communication systems can suffer from the occurrence of errors of transmitted/received data according to channel states of radio resources. However, the wireless communication systems can control or recover the errors of the data using an ARQ technique to enhance transmission reliability.

In a case of the use of an ARQ technique, a receive end informs a transmit end of success or failure of reception of data from the transmit end. For example, in a case where errors do not occur in data received from a transmit end, a receive end transmits ACKnowledgement (ACK) information to the transmit end. On the other hand, in a case where errors occur in data received from the transmit end, the receive end transmits Negative ACKnowledgement (NACK) information to the transmit end. Here, a series of operations in which the receive end transmits success or failure of reception of data to the transmit end is called ARQ feedback.

Depending on ARQ feedback information received from a receive end, a transmit end can determine success or failure of transmission of data to the receive end. If receiving ACK information from the receive end, the transmit end shall transmit new data to the receive end. On the other hand, if receiving NACK information from the receive end, the transmit end shall retransmit data associated with the NACK information to the receive end.

If a lifetime of data expires, a transmit end shall delete the data from a buffer. Also, the transmit end cannot be aware of any time point when a receive end will transmit ARQ feedback information. Thus, in a case where the transmit end fails to receive ARQ feedback information before a lifetime of data expires, there is a problem in which the transmit end should delete corresponding data in a state of lack of knowledge about a reception state of data.

Therefore, a need exists for an apparatus and method for ARQ feedback polling in a wireless communication system for recognizing a time point when ARQ feedback information is received from a receive end.

SUMMARY OF THE INVENTION

An aspect of the present invention is to address at least the above-mentioned problems and/or disadvantages and to provide at least the advantages described below. Accordingly, an aspect of the present invention is to provide an apparatus and method for Automatic Repeat reQuest (ARQ) feedback polling to a receive end in a transmit end of a wireless communication system.

Another aspect of the present invention is to provide an apparatus and method for setting a lifetime of ARQ feedback and polling ARQ feedback to a receive end in a transmit end of a wireless communication system.

A further aspect of the present invention is to provide an apparatus and method for transmitting ARQ feedback information to a transmit end within a lifetime of ARQ feedback in a receive end of a wireless communication system.

Yet another aspect of the present invention is to provide an apparatus and method for setting an ARQ feedback transmission time point and polling ARQ feedback to a receive end in a transmit end of a wireless communication system.

Still another aspect of the present invention is to provide an apparatus and method for transmitting ARQ feedback information to a transmit end at an ARQ feedback transmission time point in a receive end of a wireless communication system.

The above aspects are addressed by providing an apparatus and method for ARQ feedback polling in a wireless communication system.

In accordance with an aspect of the present invention, a method for Automatic Repeat reQuest (ARQ) feedback polling in a transmit end of a wireless communication system is provided. The method includes transmitting at least one ARQ block to a receive end, polling ARQ feedback to the receive end using an extended header, determining if ARQ feedback information is received from the receive end within a lifetime of ARQ feedback, determining success or failure of transmission of the at least one ARQ block through the ARQ feedback information if it is determined that the ARQ feedback information is received within the lifetime of ARQ feedback, and polling ARQ feedback again to the receive end if it is determined that the ARQ feedback information is not received within the lifetime of ARQ feedback.

In accordance with another aspect of the present invention, an apparatus for ARQ feedback polling in a transmit end of a wireless communication system is provided. The apparatus includes a transmit apparatus, a receive apparatus, and an ARQ controller. The transmit apparatus transmits at least one ARQ block to a receive end. The receive apparatus receives a signal. After polling ARQ feedback to the receive end through the transmit apparatus, the ARQ controller determines success or failure of transmission of the at least one ARQ block through the ARQ feedback information in a case where ARQ feedback information is received from the receive end through the receive apparatus within a lifetime of ARQ feedback, and polls ARQ feedback again to the receive end in a case where the ARQ feedback information is not received within the lifetime of ARQ feedback. The transmit apparatus may poll ARQ feedback to the receive end using an extended header.

In accordance with a further aspect of the present invention, a method for ARQ feedback polling in a transmit end of a wireless communication system is provided. The method includes transmitting at least one ARQ block to a receive end, polling ARQ feedback to the receive end using an extended header, determining if ARQ feedback information is received from the receive end at an ARQ feedback transmission time point of the receive end, determining success or failure of transmission of the at least one ARQ block through the ARQ feedback information if it is determined that the ARQ feedback information is received at the ARQ feedback transmission time point of the receive end, and polling ARQ feedback again to the receive end if it is determined that the ARQ feedback information is not received at the ARQ feedback transmission time point of the receive end.

In accordance with still another aspect of the present invention, an apparatus for ARQ feedback polling in a transmit end of a wireless communication system is provided. The apparatus includes a transmit apparatus, a receive apparatus, and an ARQ controller. The transmit apparatus transmits at least one ARQ block to a receive end. The receive apparatus receives a signal. After polling ARQ feedback to the receive end through the transmit apparatus, the ARQ controller determines success or failure of transmission of the at least one ARQ block through the ARQ feedback information in a case where ARQ feedback information is received from the receive end through the receive apparatus at an ARQ feedback transmission time point of the receive end, and polls ARQ feedback again to the receive end in a case where the ARQ feedback information is not received at the ARQ feedback transmission time point of the receive end. The transmit apparatus may poll ARQ feedback to the receive end using an extended header.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which:

FIGS. 8A to 8D are diagrams illustrating structures of headers and control messages for ARQ feedback polling in a wireless communication system according to exemplary embodiments of the present invention;

Throughout the drawings, it should be noted that like reference numbers are used to depict the same or similar elements, features, and structures.

DETAILED DESCRIPTION OF EXEMPLARY EMBODIMENTS

Figure 1:
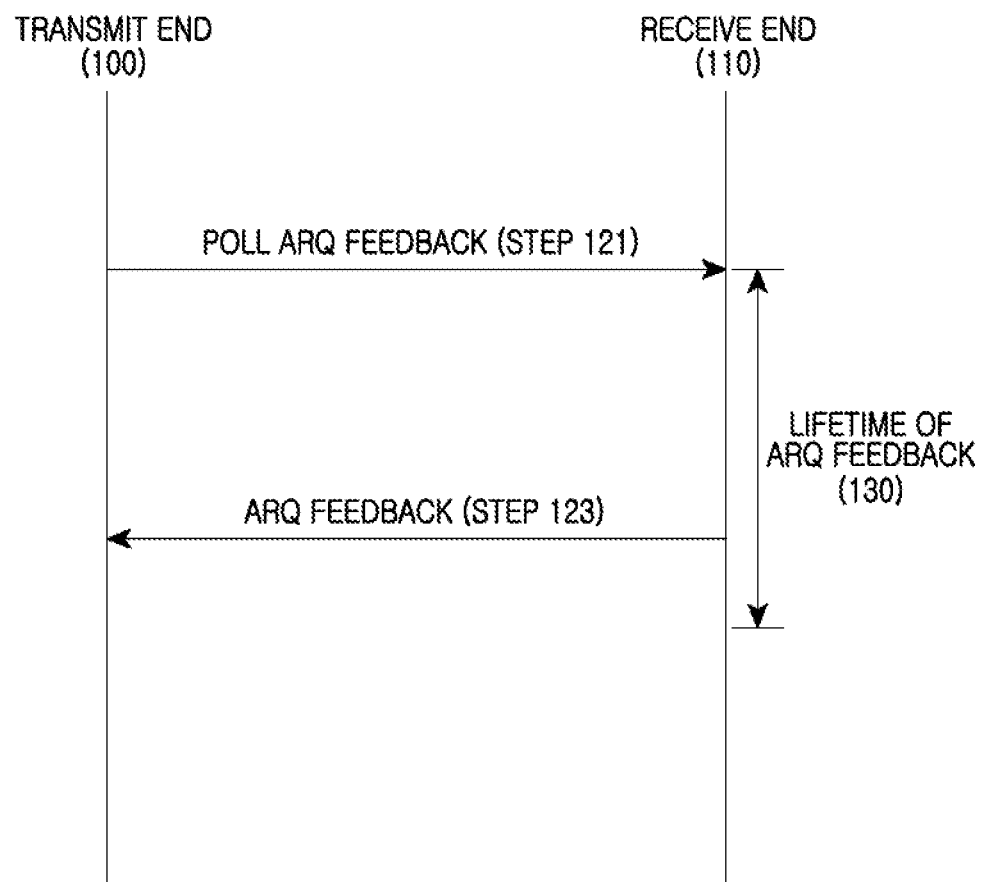
FIG. 1 is a ladder diagram illustrating a procedure for Automatic Repeat reQuest (ARQ) feedback polling in a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A technique for Automatic Repeat reQuest (ARQ) feedback polling in a transmit end of a wireless communication system according to an exemplary embodiment of the present invention is described below. Here, a series of operations in which a receive end transmits success or failure of reception of data to the transmit end is called ARQ feedback.

In the following description, it is assumed that a transmit end and a receive end each include both a Base Station (BS) and a Mobile Station (MS). For example, in a case of downlink, the transmit end becomes a BS and the receive end becomes an MS. In a case of uplink, the transmit end becomes an MS and the receive end becomes a BS.

In a case of using an ARQ technique, a transmit end determines an ARQ feedback lifetime or ARQ feedback transmission time point in order to recognize a time when a receive end will transmit ARQ feedback information. For example, upon initial access to a receive end, a transmit end determines an ARQ feedback lifetime or ARQ feedback transmission time point of the receive end as a parameter value. In this case, the transmit end uses the ARQ feedback lifetime or ARQ feedback transmission time point determined at the time of initial access, as a fixed value. In another example, upon data service parameter determination with a receive end, a transmit end may determine an ARQ feedback lifetime or ARQ feedback transmission time point of the receive end as a parameter value. In this case, the transmit end uses the ARQ feedback lifetime or ARQ feedback transmission time point determined at the time of service parameter determination, as a fixed value. Here, the service parameter determination includes Dynamic Service Addition (DSA). In a further example, a transmit end may determine an ARQ feedback lifetime or ARQ feedback transmission time point for every occurrence of ARQ feedback polling. In this case, the transmit end may vary the ARQ feedback lifetime or ARQ feedback transmission time point for every occurrence of ARQ feedback polling.

In a case where a transmit end determines a lifetime of ARQ feedback, the transmit end polls ARQ feedback as illustrated in FIG. 1, and a receive end transmits ARQ feedback information as illustrated in FIG. 1.

FIG. 1 is a ladder diagram illustrating a procedure for ARQ feedback polling in a wireless communication system according to an exemplary embodiment of the present invention.

Referring to FIG. 1, in step 121, a transmit end 100 polls ARQ feedback for an ARQ block to a receive end 110. For example, the transmit end 100 constructs ARQ feedback polling information and ARQ feedback lifetime 130 information in a format of an extended header as illustrated in FIG. 8A or 8B, and transmits the constructed information to the receive end 110. In another example, the transmit end 100 may construct ARQ feedback polling information and ARQ feedback lifetime 130 information in a format of a control message of a Media Access Control (MAC) layer (i.e., a MAC management message) as illustrated in FIG. 8C or 8D, and transmit the constructed information to the receive end 110.

In step 123, the receive end 110 transmits ARQ feedback information regarding data received from the transmit end 100, to the transmit end 100 within an ARQ feedback lifetime 130 received from the transmit end 100. For example, in a case where there is a signal transmitted from the receive end 110 to the transmit end 100 within an ARQ feedback lifetime, the receive end 110 includes ARQ feedback information in the signal and transmits the signal including the ARQ feedback information to the transmit end 100 within the ARQ feedback lifetime. On the other hand, in a case where there is not a signal transmitted to the transmit end 100 within an ARQ feedback lifetime, the receive end 110 may transmit only ARQ feedback information to the transmit end 100 within the ARQ feedback lifetime. Here, the ARQ feedback information includes ACKnowledgement/Negative ACKnowledgement (ACK/NACK) information regarding data received from the transmit end 100. The NACK information represents an error occurring in the data, and the ACK information represents an error not occurring in the data.

In the aforementioned exemplary embodiment of the present invention, upon ARQ feedback polling, a transmit end 100 transmits a lifetime of ARQ feedback to a receive end 110.

In an exemplary implementation, upon initial access to a receive end 110, a transmit end 100 determines a lifetime of ARQ feedback as a parameter value. In this case, the transmit end 100 and the receive end 110 may use the lifetime of ARQ feedback determined at the time of initial access, as a fixed value. Thus, upon ARQ feedback polling, the transmit end 100 does not transmit a lifetime of ARQ feedback to the receive end 110.

In another exemplary implementation, upon data service parameter determination with a receive end 110, a transmit end 100 determines a lifetime of ARQ feedback as a parameter value. In this case, the transmit end 100 and the receive end 110 may use the lifetime of ARQ feedback determined at the time of service parameter determination, as a fixed value.

Thus, upon ARQ feedback polling, the transmit end 100 does not transmit a lifetime of ARQ feedback to the receive end 110.

In the aforementioned exemplary embodiment of the present invention, in a case where there is not a signal transmitted to the transmit end 100 within a lifetime of ARQ feedback, the receive end 110 transmits only ARQ feedback information to the transmit end 100. In this case, the receive end 110 transmits a band polling message for ARQ feedback, to the transmit end 100. If the band polling message is received, the transmit end 100 allocates a resource for ARQ feedback through scheduling. Thus, the receive end 110 transmits ARQ feedback information to the transmit end 100 through the resource allocated from the transmit end 100.

In a case where a transmit end determines an ARQ feedback transmission time point, the transmit end polls ARQ feedback and the receive end transmits ARQ feedback information as described in FIG. 2 below.

Figure 2:
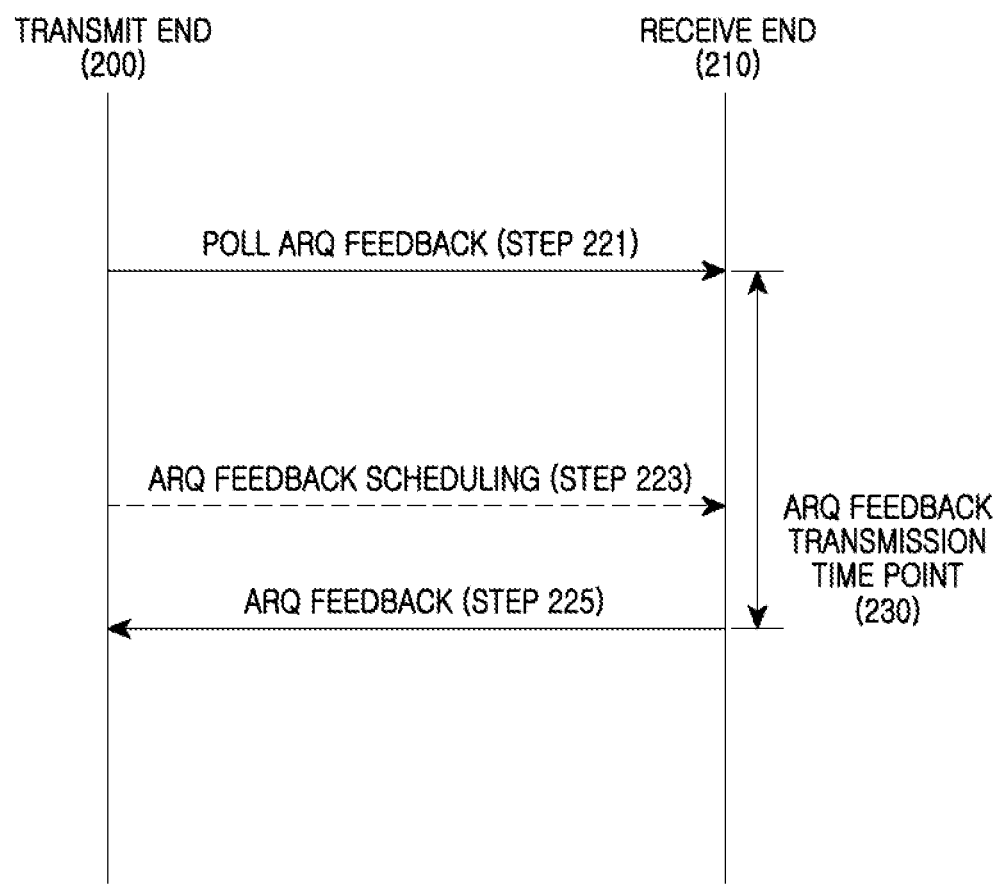
FIG. 2 is a ladder diagram illustrating a procedure for ARQ feedback polling in a wireless communication system according to an exemplary embodiment of the present invention.

FIG. 2 is a ladder diagram illustrating a procedure for ARQ feedback polling in a wireless communication system according to an exemplary embodiment of the present invention.

Referring to FIG. 2, in step 221, a transmit end 200 polls ARQ feedback for an ARQ block to a receive end 210. For example, the transmit end 200 constructs ARQ feedback polling information and ARQ feedback transmission time point 230 information in a format of an extended header as illustrated in FIG. 8A or 8B, and transmits the constructed information to the receive end 210. In another example, the transmit end 200 may construct ARQ feedback polling information and ARQ feedback transmission time point 230 information in a format of a control message of a MAC layer (i.e., a MAC management message) as illustrated in FIG. 8C or 8D, and transmit the constructed information to the receive end 210.

In step 225, the receive end 210 transmits ARQ feedback information to the transmit end 200 at an ARQ feedback transmission time point 230 received from the transmit end 200. For example, in a case where there is a signal transmitted from the receive end 210 to the transmit end 200 at an ARQ feedback transmission time point, the receive end 210 includes ARQ feedback information in the signal and transmits the signal including the ARQ feedback information to the transmit end 200 at the ARQ feedback transmission time point. In this case, the transmit end 200 does not have to perform scheduling for ARQ feedback. On the other hand, in a case where there is not a signal transmitted to the transmit end 200 at an ARQ feedback transmission time point, the receive end 210 may transmit only ARQ feedback information to the transmit end 200 at the ARQ feedback transmission time point. In this case, in step 223, the transmit end 200 allocates a resource for ARQ feedback through scheduling considering ARQ feedback transmission time point information of the receive end 210. Thus, in step 225, the receive end 210 transmits ARQ feedback information to the transmit end 200 through the resource allocated from the transmit end 200.

In the aforementioned exemplary embodiment of the present invention, upon ARQ feedback polling, a transmit end 200 transmits ARQ feedback transmission time point information to a receive end 210.

In an exemplary implementation, upon initial access to a receive end 210, a transmit end 200 determines an ARQ feedback transmission time point as a parameter value. In this case, the transmit end 200 and the receive end 210 may use the ARQ feedback transmission time point determined at the time of initial access, as a fixed value. Thus, upon ARQ feedback polling, the transmit end 200 does not transmit an ARQ feedback transmission time point to the receive end 210.

In another exemplary implementation, upon data service parameter determination with a receive end 210, a transmit end 200 determines an ARQ feedback transmission time point as a parameter value. In this case, the transmit end 200 and the receive end 210 may use the ARQ feedback transmission time point determined at the time of service parameter determination, as a fixed value. Thus, upon ARQ feedback polling, the transmit end 200 does not transmit an ARQ feedback transmission time point to the receive end 210.

As described above, a transmit end determines an ARQ feedback lifetime or ARQ feedback transmission time point. Thus, the transmit end may be aware of a time point when a receive end transmits ARQ feedback information. If failing to receive ARQ feedback information at a determined time point, the transmit end shall again poll ARQ feedback as described in FIG. 3.

Figure 3:
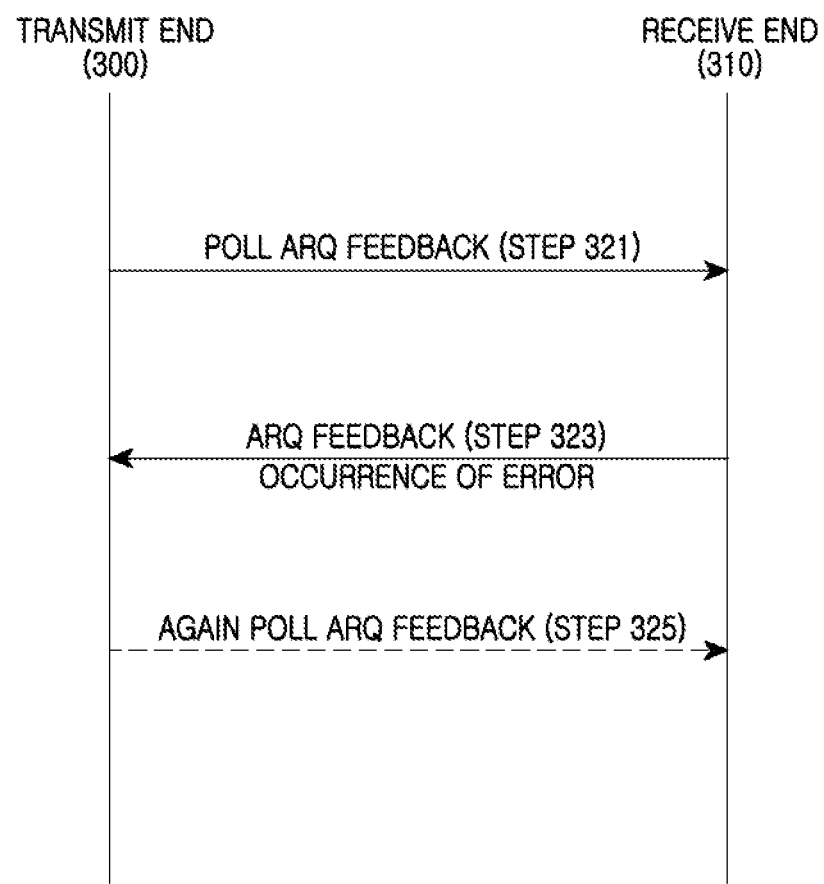
FIG. 3 is a ladder diagram illustrating a procedure for ARQ feedback polling in a wireless communication system according to an exemplary embodiment of the present invention.

FIG. 3 is a ladder diagram illustrating a procedure for ARQ feedback polling in a wireless communication system according to an exemplary embodiment of the present invention.

Referring to FIG. 3, in step 321, a transmit end 300 polls ARQ feedback for an ARQ block to a receive end 310. For example, the transmit end 300 constructs ARQ feedback polling information and ARQ feedback lifetime information or ARQ feedback transmission time point information in a format of an extended header as illustrated in FIG. 8A or 8B, and transmits the constructed information to the receive end 310. In another example, the transmit end 300 may construct ARQ feedback polling information and ARQ feedback lifetime information or ARQ feedback transmission time point information in a format of a control message of a MAC layer (i.e., a MAC management message) as illustrated in FIG. 8C or 8D, and transmit the constructed information to the receive end 310.

In step 323, the receive end 310 transmits ARQ feedback information to the transmit end 300 in consideration of an ARQ feedback lifetime or ARQ feedback transmission time point received from the transmit end 300.

In a case where an error occurs in the ARQ feedback information received from the receive end 310, the transmit end 300 determines whether to again poll ARQ feedback. At this time, in a case where a lifetime for an ARQ block expires or the ARQ block is deleted from a buffer, the transmit end 300 does not poll ARQ feedback again.

If it is determined to poll ARQ feedback again, in step 325, the transmit end 300 may poll ARQ feedback again for an ARQ block to the receive end 310.

In the aforementioned exemplary embodiment of the present invention, in a case where an error occurs in ARQ feedback information received from the receive end 310, the transmit end 300 determines whether to poll ARQ feedback again.

In an exemplary implementation, in a case where failing to receive ARQ feedback information from the receive end 310 within a lifetime of ARQ feedback, the transmit end 300 may determine whether to poll ARQ feedback again.

In another exemplary implementation, in a case where failing to receive ARQ feedback information from the receive end 310 at an ARQ feedback transmission time point, the transmit end 300 may determine whether to poll ARQ feedback again.

The following description is made for an operation method of a transmit end for setting a lifetime of ARQ feedback and polling ARQ feedback.

Figure 4:
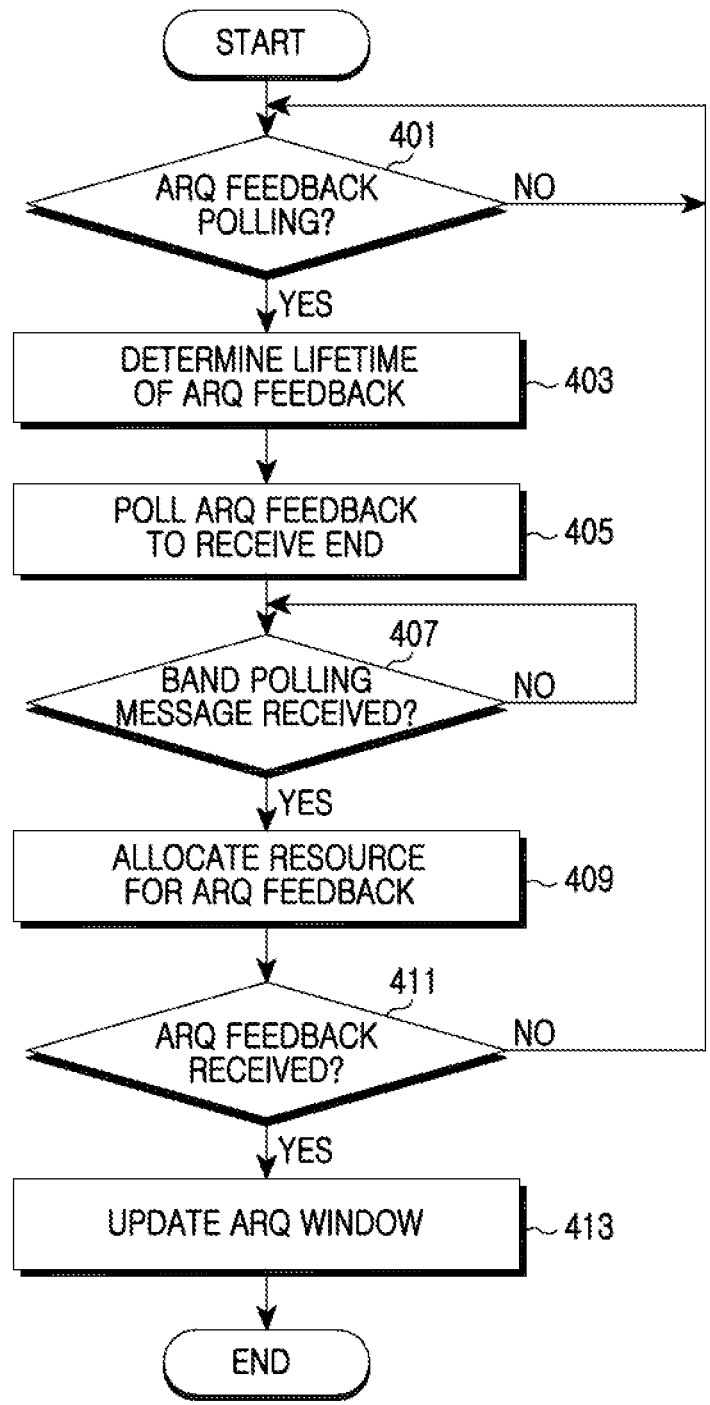
FIG. 4 is a flow diagram illustrating a procedure for ARQ feedback polling in a transmit end of a wireless communication system according to an exemplary embodiment of the present invention.

FIG. 4 is a flow diagram illustrating a procedure for ARQ feedback polling in a transmit end of a wireless communication system according to an exemplary embodiment of the present invention.

Referring to FIG. 4, in step 401, a transmit end determines whether to poll ARQ feedback for an ARQ block, which the transmit end has transmitted to a receive end, to the receive end.

If polling ARQ feedback to the receive end, the transmit end shall proceed to step 403. In step 403, the transmit end determines a lifetime of ARQ feedback. For example, the transmit end determines a lifetime of ARQ feedback, which is determined at the time of initial access to the receive end to which the transmit end polls ARQ feedback or at the time of service parameter determination. In another example, the transmit end may determine a state of a window of an ARQ block for which the transmit end polls ARQ feedback, and determine a lifetime of ARQ feedback. In a further example, the transmit end may determine a lifetime of ARQ feedback considering a lifetime for an ARQ block having the shortest lifetime among ARQ blocks for which the transmit end fails to receive ARQ feedback information from the receive end.

After determining the lifetime of ARQ feedback, the transmit end proceeds to step 405. In step 405, the transmit end polls ARQ feedback to the receive end. For example, the transmit end constructs ARQ feedback polling information and ARQ feedback lifetime information in a format of an extended header as illustrated in FIG. 8A or 8B, and transmits the constructed information to the receive end. In another example, the transmit end may construct ARQ feedback polling information and ARQ feedback lifetime information in a format of a control message of a MAC layer (i.e., a MAC management message) as illustrated in FIG. 8C or 8D, and transmit the constructed information to the receive end. In a further example, in a case where the transmit end and the receive end use a lifetime of ARQ block as a fixed value, the transmit end may transmit only ARQ feedback polling information to the receive end.

The transmit end proceeds to step 407. In step 407, the transmit end determines if a band polling message is received from the receive end to which the transmit end has polled ARQ feedback.

If it is determined that the band polling message is received from the receive end, the transmit end may proceed to step 409. In step 409, the transmit end allocates the receive end a resource for ARQ feedback through scheduling. That is, the transmit end transmits resource allocation information for ARQ feedback, to the receive end.

After allocating the resource for ARQ feedback, the transmit end proceeds to step 411. In step 411, the transmit end determines if ARQ feedback information is received from the receive end within the lifetime of ARQ feedback.

If the ARQ feedback information is not received from the receive end within the lifetime of ARQ feedback, the transmit end may return to step 401 and determine whether to poll ARQ feedback again to the receive end. For example, if a lifetime for an ARQ block for which the transmit end has to receive ARQ feedback information expires or the ARQ block is deleted from a buffer, the transmit end may determine not to poll ARQ feedback again to the receive end.

On the other hand, if the ARQ feedback information is received from the receive end within the lifetime of ARQ feedback, the transmit end may proceed to step 413. In step 413, the transmit end updates an ARQ window.

The transmit end terminates the procedure.

In the aforementioned exemplary embodiment of the present invention, a transmit end allocates a resource for ARQ feedback according to band polling of a receive end.

In an exemplary implementation, a receive end includes ARQ feedback information in a signal transmitted to a transmit end and transmits the signal including the ARQ feedback information within a lifetime of ARQ feedback. In this case, the transmit end does not allocate a resource for ARQ feedback separately. Accordingly, in FIG. 4, after polling ARQ feedback to the receive end in step 405, the transmit end proceeds to step 411. In step 411, the transmit end determines if ARQ feedback information is received from the receive end within a lifetime of ARQ feedback.

In another exemplary implementation, in a case where a receive end performs signal scheduling of a transmit end, the receive end does not have to be allocated a resource for ARQ feedback from the transmit end. Accordingly, in FIG. 4, after polling ARQ feedback to the receive end in step 405, the transmit end proceeds to step 411. In step 411, the transmit end determines if ARQ feedback information is received from the receive end within a lifetime of ARQ feedback.

As described above, in a case where a transmit end polls ARQ feedback, a receive end transmits ARQ feedback information as described in FIG. 5 below.

Figure 5:
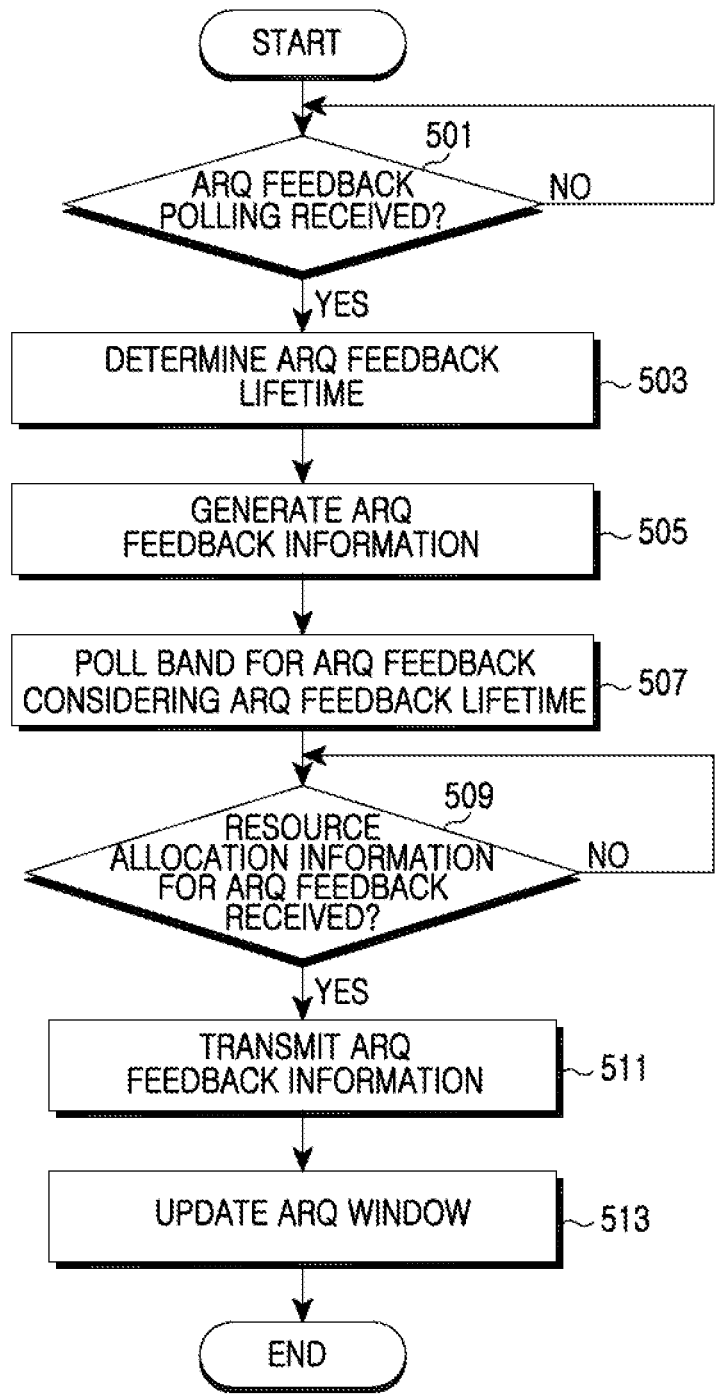
FIG. 5 is a flow diagram illustrating a procedure for ARQ feedback response in a receive end of a wireless communication system according to an exemplary embodiment of the present invention.

FIG. 5 is a flow diagram illustrating a procedure for ARQ feedback response in a receive end of a wireless communication system according to an exemplary embodiment of the present invention.

Referring to FIG. 5, in step 501, a receive end determines if a transmit end polls ARQ feedback.

If it is determined that the transmit end polls the ARQ feedback, the receive end may proceed to step 503. In step 503, the receive end determines a lifetime of ARQ feedback. For example, the receive end determines a lifetime of ARQ feedback, which is determined by the transmit end at the time of initial access to the transmit end. In another example, the receive end may determine a lifetime of ARQ feedback, which is determined by the transmit end at the time of data service parameter determination with the transmit end. In a further example, the receive end may determine a lifetime of ARQ feedback in an extended header, as illustrated in FIG. 8A or 8B, received from the transmit end. In yet another example, the receive end may determine a lifetime of ARQ feedback in a control message of a MAC layer (i.e., a MAC management message), as illustrated in FIG. 8C or 8D, received from the transmit end.

After determining the lifetime of ARQ feedback, the receive end proceeds to step 505 and generates ARQ feedback information. For example, in a case where an error occurs in data received from the transmit end, the receive end generates NACK information. On the other hand, in a case where an error does not occur in data received from the transmit end, the receive end generates ACK information.

After generating the ARQ feedback information, the receive end proceeds to step 507. In step 507, the receive end polls a resource for ARQ feedback to the transmit end considering the lifetime of ARQ feedback.

The receive end proceeds to step 509. In step 509, the receive end determines if resource allocation information for ARQ feedback is received from the transmit end.

If it is determined in step 509 that the resource allocation information for ARQ feedback is received from the transmit end, the receive end may proceed to step 511 and transmit ARQ feedback information to the transmit end based on the resource allocation information.

After transmitting the ARQ feedback information, the receive end proceeds to step 513. In step 513, the receive end updates an ARQ window.

The receive end terminates the procedure.

In the aforementioned exemplary embodiment of the present invention, after determining a lifetime of ARQ feedback, a receive end generates ARQ feedback information.

In an exemplary implementation, a receive end may generate ARQ feedback information any time from after receiving an ARQ block to before transmitting the ARQ feedback information.

In the aforementioned exemplary embodiment of the present invention, since there is no signal transmitted to the transmit end by the receive end within a lifetime of ARQ feedback, the receive end polls a resource for ARQ feedback to the transmit end.

In another exemplary implementation, a receive end includes ARQ feedback information in a signal transmitted to a transmit end and transmits the signal including the ARQ feedback information within a lifetime of ARQ feedback. In this case, the receive end does not poll a band for ARQ feedback. Accordingly, in FIG. 5, after generating the ARQ feedback information in step 505, the receive end proceeds to step 511 and includes the ARQ feedback information in the signal transmitted to the transmit end and transmits the signal including the ARQ feedback information within the lifetime of ARQ feedback.

In another exemplary implementation, in a case where a receive end performs signal scheduling of a transmit end, the receive end does not have to be allocated a resource for ARQ feedback from the transmit end. Accordingly, in FIG. 5, after generating ARQ feedback information in step 505, the receive end proceeds to step 511. In step 511, the receive end includes the ARQ feedback information in a signal transmitted to the transmit end and transmits the signal including the ARQ feedback information within a lifetime of ARQ feedback.

The following description is made for an exemplary operation method of a transmit end for setting an ARQ feedback transmission time point and polling ARQ feedback.

Figure 6:
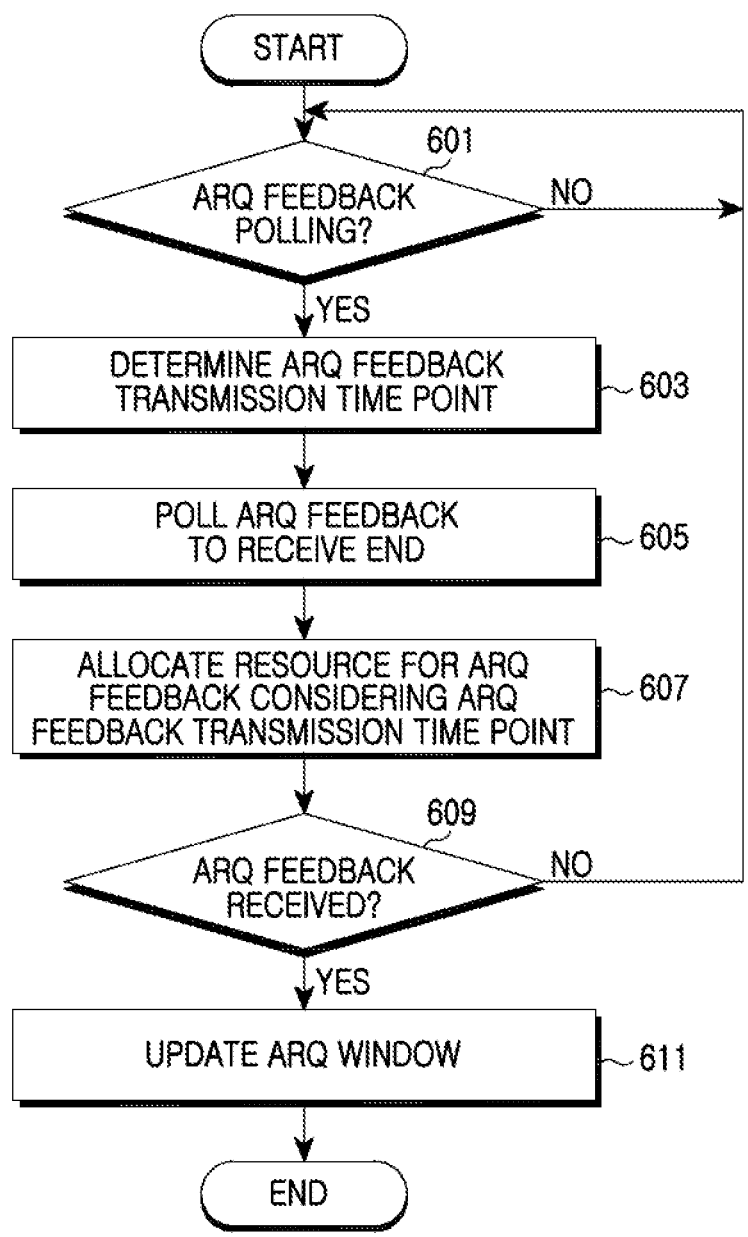
FIG. 6 is a flow diagram illustrating a procedure for ARQ feedback polling in a transmit end of a wireless communication system according to an exemplary embodiment of the present invention.

FIG. 6 is a flow diagram illustrating a procedure for ARQ feedback polling in a transmit end of a wireless communication system according to an exemplary embodiment of the present invention.

Referring to FIG. 6, in step 601, a transmit end determines whether to poll ARQ feedback for an ARQ block, which the transmit end has transmitted to a receive end, to the receive end.

If it is determined to poll the ARQ feedback to the receive end, the transmit end may proceed to step 603. In step 603, the transmit end determines an ARQ feedback transmission time point. For example, the transmit end determines an ARQ feedback transmission time point, which is determined at the time of initial access to the receive end. In another example, the transmit end may determine a state of a window of an ARQ block for which the transmit end polls ARQ feedback and determine an ARQ feedback transmission time point. In a further example, the transmit end may determine an ARQ feedback transmission time point considering a lifetime for an ARQ block having the shortest lifetime among ARQ blocks for which the transmit end fails to receive ARQ feedback information from the receive end.

After determining the ARQ feedback transmission time point, the transmit end proceeds to step 605. In step 605, the transmit end polls ARQ feedback to the receive end. For example, the transmit end constructs ARQ feedback polling information and ARQ feedback transmission time point information in a format of an extended header as illustrated in FIG. 8A or 8B, and transmits the constructed information to the receive end. In another example, the transmit end may construct ARQ feedback polling information and ARQ feedback transmission time point information in a format of a control message of a MAC layer (i.e., a MAC management message) as illustrated in FIG. 8C or 8D, and transmit the constructed information to the receive end.

The transmit end proceeds to step 607. In step 607, the transmit end allocates the receive end a resource for ARQ feedback through scheduling considering the ARQ feedback transmission time point. That is, the transmit end transmits resource allocation information for ARQ feedback, to the receive end.

After allocating the resource for ARQ feedback, the transmit end proceeds to step 609. In step 609, the transmit end determines if ARQ feedback information is received from the receive end at the ARQ feedback transmission time point.

If it is determined that the ARQ feedback information is not received from the receive end at the ARQ feedback transmission time point, the transmit end may return to step 601 and determine whether to again poll ARQ feedback. For example, if a lifetime for an ARQ block expires or the ARQ block is deleted from a buffer, the transmit end may determine not to poll ARQ feedback again.

On the other hand, if it is determined that the ARQ feedback information is received from the receive end at the ARQ feedback transmission time point, the transmit end may proceed to step 611 and update an ARQ window.

The transmit end terminates the procedure.

In the aforementioned exemplary embodiment of the present invention, a transmit end allocates a receive end a resource for ARQ feedback considering an ARQ feedback transmission time point.

In an exemplary implementation, a receive end includes ARQ feedback information in a signal transmitted to a transmit end and transmits the signal including the ARQ feedback information at an ARQ feedback transmission time point. In this case, the transmit end does not allocate a resource for ARQ feedback separately. Accordingly, after polling ARQ feedback to the receive end in step 605, the transmit end proceeds to step 611. In step 611, the transmit end determines if ARQ feedback information is received from the receive end at the ARQ feedback transmission time point.

In an exemplary implementation, in a case where a receive end performs signal scheduling of a transmit end, the receive end does not have to be allocated a resource for ARQ feedback from the transmit end. Accordingly, after polling ARQ feedback to the receive end in step 605, the transmit end proceeds to step 609. In step 609, the transmit end determines if ARQ feedback information is received from the receive end at an ARQ feedback transmission time point.

As described above, in a case where a transmit end polls ARQ feedback, a receive end transmits ARQ feedback information as described in FIG. 7 below.

Figure 7:
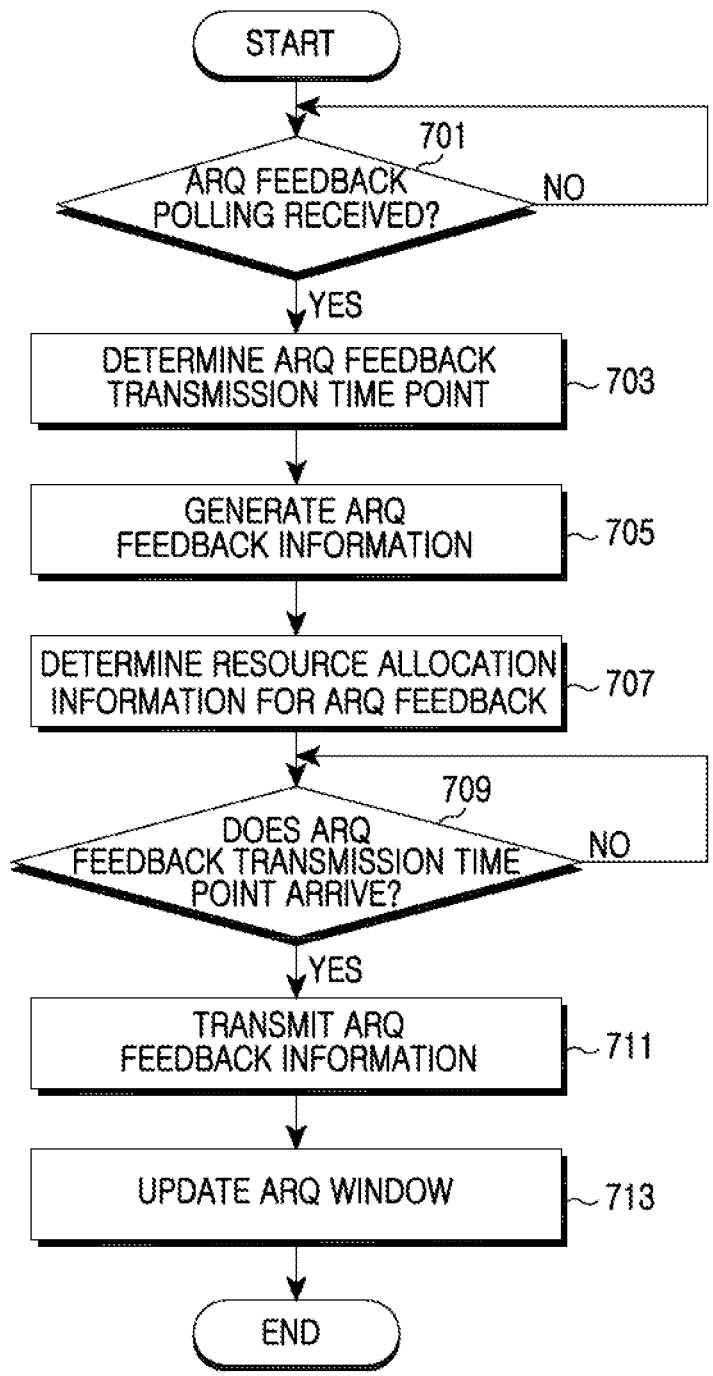
FIG. 7 is a flow diagram illustrating a procedure for ARQ feedback response in a receive end of a wireless communication system according to an exemplary embodiment of the present invention.

FIG. 7 is a flow diagram illustrating a procedure for ARQ feedback response in a receive end of a wireless communication system according to an exemplary embodiment of the present invention.

Referring to FIG. 7, in step 701, a receive end determines if a transmit end polls ARQ feedback.

If it is determined that the transmit end polls the ARQ feedback, the receive end may proceed to step 703. In step 703, the receive end determines an ARQ feedback transmission time point. For example, the receive end determines an ARQ feedback transmission time point, which is determined at the time of initial access to the transmit end. In another example, the receive end may determine an ARQ feedback transmission time point, which is determined at the time of data service parameter determination with the transmit end. In a further example, the receive end may determine an ARQ feedback transmission time point in an extended header, as illustrated in FIG. 8A or 8B, received from the transmit end.

In yet another example, the receive end may determine an ARQ feedback transmission time point in a control message of a MAC layer (i.e., a MAC management message), as illustrated in FIG. 8C or 8D, received from the transmit end.

After determining the ARQ feedback transmission time point, the receive end proceeds to step 705. In step 705, the receive end generates ARQ feedback information. For example, in a case where an error occurs in data received from the transmit end, the receive end generates NACK information. On the other hand, in a case where an error does not occur in data received from the transmit end, the receive end generates ACK information.

After generating the ARQ feedback information, the receive end proceeds to step 707. In step 707, the receive end determines a resource for ARQ feedback allocated by the transmit end.

After determining the resource for ARQ feedback, the receive end proceeds to step 709. In step 709, the receive end determines if the ARQ feedback transmission time point arrives.

If it is determined that the ARQ feedback transmission time point arrives, the receive end may proceed to step 711. In step 711, the receive end transmits ARQ feedback information to the transmit end based on the resource for ARQ feedback allocated from the transmit end.

After transmitting the ARQ feedback information, the receive end proceeds to step 713. In step 713, the receive end updates an ARQ window.

The receive end terminates the procedure.

In the aforementioned exemplary embodiment of the present invention, after determining an ARQ feedback transmission time point, a receive end generates ARQ feedback information.

In an exemplary implementation, a receive end may generate ARQ feedback information any time from after receiving an ARQ block to before transmitting the ARQ feedback information.

In the aforementioned exemplary embodiment of the present invention, since there is not a signal transmitted to a transmit end at an ARQ feedback transmission time point, a receive end is allocated a resource and transmits ARQ feedback information to the transmit end.

In an exemplary implementation, a receive end includes ARQ feedback information in a signal transmitted to a transmit end and transmits the signal including the ARQ feedback information at an ARQ feedback transmission time point. In this case, the receive end does not have to be allocated a resource for ARQ feedback from the transmit end. Accordingly, after generating ARQ feedback information in step 705, the receive end proceeds to step 709. In step 709, the receive end determines if the ARQ feedback transmission time point arrives.

In another exemplary implementation, in a case where a receive end performs signal scheduling of a transmit end, the receive end does not have to be allocated a resource for ARQ feedback from the transmit end. Accordingly, after generating ARQ feedback information in step 705, the receive end proceeds to step 709. In step 709, the receive end determines if an ARQ feedback transmission time point arrives.

The following description is made for an exemplary structure of a signal for a transmit end to transmit ARQ feedback polling and an ARQ feedback lifetime or ARQ feedback transmission time point to a receive end.

FIGS. 8A to 8D are diagrams illustrating structures of headers and control messages for ARQ feedback polling in a wireless communication system according to exemplary embodiments of the present invention.

Referring to FIGS. 8A and 8B, structures of extended headers are illustrated to include ARQ feedback polling information and ARQ feedback lifetime information or ARQ feedback transmission time point information. Referring to FIGS. 8C and 8D, structures of control messages are illustrated to include ARQ feedback polling information and ARQ feedback lifetime information or ARQ feedback transmission time point information.

A transmit end transmits ARQ feedback polling information and ARQ feedback lifetime information or ARQ feedback transmission time point information to a receive end, using an extended header between a Generic MAC Header (GMH) and MAC Protocol Data Unit (MPDU) data. For example, the transmit end may construct an extended header for ARQ feedback polling as illustrated in FIG. 8A. Here, the extended header includes at least one of a flow IDentifier (ID) field including service connection ID information polling ARQ feedback, an ARQ feedback polling field representing ARQ feedback polling, and an ARQ feedback timing information field including ARQ feedback lifetime information or ARQ feedback transmission time point information. In a case where an MPDU payload includes Service Data Units (SDUs) constructed in a plurality of services, the extended header may include at least one flow ID field, at least one ARQ feedback polling field, or at least one ARQ feedback timing information field. That is, in a case where an MPDU payload includes two SDUs constructed in two services, the extended header may include two flow ID fields for each SDU.

In the aforementioned structure of an extended header, in a case where a type of the extended header is defined as ARQ feedback polling, the extended header may not include an ARQ feedback polling field. Also, in a case where service connection ID information of the extended header is the same as service connection ID information included in a GMH, the extended header may not include a flow ID field. Also, in a case where a transmit end and a receive end determine an ARQ feedback lifetime or ARQ feedback transmission time point at the time of initial access or data service parameter determination, the extended header may not include an ARQ feedback timing information field.

The transmit end may include ARQ feedback polling information in an extended header utilized for other ways as illustrated in FIG. 8B. Here, the extended header additionally includes an ARQ feedback polling field representing ARQ feedback polling, and an ARQ feedback timing information field including ARQ feedback lifetime information or ARQ feedback transmission time point information. In a case where an MPDU payload includes SDUs constructed in a plurality of services, the extended header may include at least one ARQ feedback polling field or at least one ARQ feedback timing information field. That is, in a case where an MPDU payload includes two SDUs constructed in two services, the extended header may include two ARQ feedback polling fields for each SDU.

In a case where there is no MPDU data transmitted from a receive end to a transmit end, the transmit end may construct ARQ feedback polling information and ARQ feedback lifetime information or ARQ feedback transmission time point information in a format of a control message of a MAC layer, and transmit the constructed information to the receive end. For example, the transmit end may construct a control message for ARQ feedback polling as illustrated in FIG. 8C. Here, the control message includes at least one of a flow ID field including service connection ID information polling ARQ feedback, an ARQ feedback polling field representing ARQ feedback polling, and an ARQ feedback timing information field including ARQ feedback lifetime information or ARQ feedback transmission time point information. In a case where an MPDU payload includes SDUs constructed in a plurality of services, the control message may include at least one flow ID field, at least one ARQ feedback polling field, and at least one ARQ feedback timing information field. That is, in a case where an MPDU payload includes two SDUs constructed in two services, the control message may include two flow ID fields for each SDU.

In the aforementioned structure of a control message, in a case where a type of the control message is defined as ARQ feedback polling, the control message may not include an ARQ feedback polling field. Also, in a case where service connection ID information of the control message is the same as service connection ID information included in a GMH, the control message may not include a flow ID field. Also, in a case where a transmit end and a receive end determine an ARQ feedback lifetime or ARQ feedback transmission time point at the time of initial access or data service parameter determination, the control message may include an ARQ feedback timing information field.

The transmit end may add ARQ feedback polling information to a control message utilized for other ways as illustrated in FIG. 8D. Here, the control message is constructed in a format adding an ARQ feedback polling field representing ARQ feedback polling and an ARQ feedback timing information field including ARQ feedback lifetime information or ARQ feedback transmission time point information. In a case where an MPDU payload includes SDUs constructed in a plurality of services, the control message may include at least one ARQ feedback polling field or at least one ARQ feedback timing information field. That is, in a case where an MPDU payload includes two SDUs constructed in two services, the control message may include two ARQ feedback polling fields for each SDU.

In a case where an ARQ feedback polling field is defined as one bit, the transmit end may set the ARQ feedback polling field to '1' when polling ARQ feedback, and set the ARQ feedback polling field to '0' when not polling ARQ feedback.

Also, the transmit end may set an ARQ feedback lifetime or ARQ feedback transmission time point as an absolute time value, or set as a relative time value based on a time point of signal transmission at a transmit end or a time point of signal reception at a receive end. At this time, the transmit end may set an ARQ feedback lifetime or ARQ feedback transmission time point as a time value, or set as a frame value of a physical layer.

The following description is made for an exemplary construction of a transmit end for polling ARQ feedback.

Figure 9:
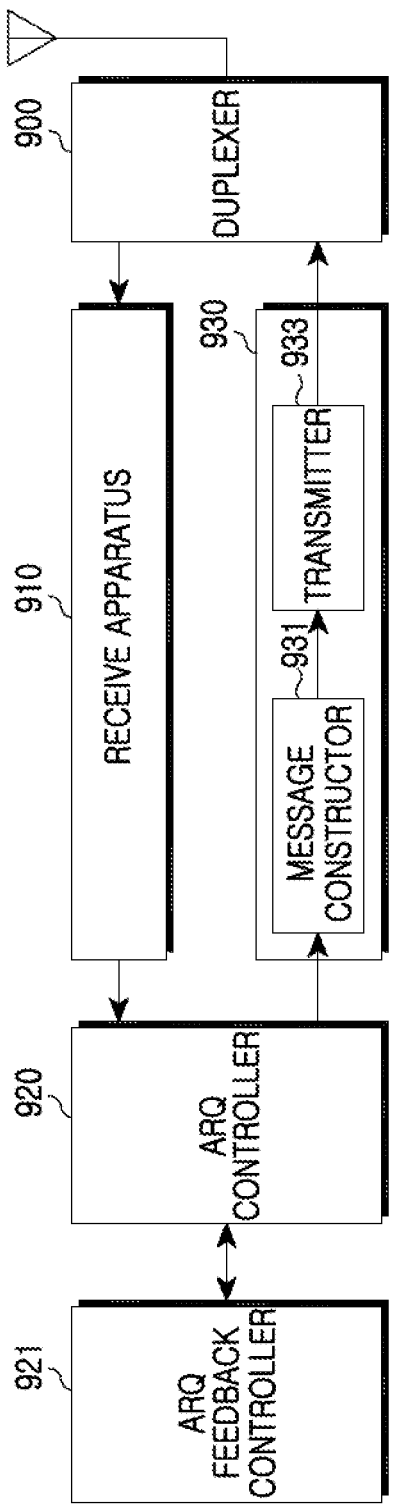
FIG. 9 is a block diagram illustrating a construction of a transmit end in a wireless communication system according to an exemplary embodiment of the present invention.

FIG. 9 is a block diagram illustrating a construction of a transmit end in a wireless communication system according to an exemplary embodiment of the present invention.

Referring to FIG. 9, a transmit end includes a duplexer 900, a receive apparatus 910, an ARQ controller 920, an ARQ feedback controller 921, and a transmit apparatus 930.

According to a duplexing scheme, the duplexer 900 transmits a transmit signal provided from the transmit apparatus 930 through an antenna and provides a receive signal from the antenna to the receive apparatus 910. For example, in a case of a Time Division Duplexing (TDD) scheme, the duplexer 900 transmits a transmit signal provided from the transmit apparatus 930 through the antenna during a transmission duration, and the duplexer 900 provides a receive signal from the antenna to the receive apparatus 910 during a reception duration.

The receive apparatus 910 converts a high frequency signal provided from the duplexer 900 into a baseband signal. The receive apparatus 910 demodulates and decodes the baseband signal. For example, the receive apparatus 910 may include a Radio Frequency (RF) processing block, a demodulating block, a channel decoding block, and the like. The RF processing block converts a high frequency signal received through the antenna into a baseband signal. The demodulating block may include a Fast Fourier Transform (FFT) operator for extracting data loaded on each subcarrier from a signal provided from the RF processing block, and the like. The channel decoding block may include a demodulator, a de-interleaver, a channel decoder, and the like.

The ARQ controller 920 controls ARQ with a receive end. For example, in a case where the ARQ controller 920 is provided with NACK information from the receive apparatus 910, the ARQ controller 920 controls to retransmit data for the NACK information. In another example, in a case where the ARQ controller 920 is provided with ACK information from the receive apparatus 910, the ARQ controller 920 recognizes transmission success of data for the ACK information.

The ARQ controller 920 controls and manages a lifetime for an ARQ block. For example, at a time when transmitting an ARQ block to a receive end, the ARQ controller 920 drives a timer representing a lifetime for the ARQ block. Also, in a case where a lifetime for an ARQ block expires, the ARQ controller 920 controls to stop ARQ for the ARQ block.

After polling ARQ feedback to a receive end, the ARQ controller 920 allocates the receive end a resource for ARQ feedback. For example, the ARQ controller 920 allocates the receive end a resource for ARQ feedback in accordance with a request of the receive end. In another example, the ARQ controller 920 may allocate the receive end a resource for ARQ feedback considering timing information at which the receive end will transmit ARQ feedback.

The ARQ feedback controller 921 determines timing information at which the receive end will transmit ARQ feedback. For example, upon initial access to the receive end, the ARQ feedback controller 921 determines an ARQ feedback lifetime or ARQ feedback transmission time point of the receive end as a parameter value. In this case, the ARQ feedback controller 921 uses the ARQ feedback lifetime or ARQ feedback transmission time point determined at the time of initial access, as a fixed value. In another example, upon data service parameter determination with the receive end, the ARQ feedback controller 921 may determine an ARQ feedback lifetime or ARQ feedback transmission time point of the receive end as a parameter value. In this case, the ARQ feedback controller 921 uses the ARQ feedback lifetime or ARQ feedback transmission time point determined at the time of data service parameter determination, as a fixed value. In a further example, the ARQ feedback controller 921 may determine an ARQ feedback lifetime or ARQ feedback transmission time point every time for ARQ feedback polling. In this case, the ARQ feedback controller 921 may vary the ARQ feedback lifetime or an ARQ feedback transmission time point every time for ARQ feedback polling.

The ARQ feedback controller 921 determines whether to poll ARQ feedback to the receive end. For example, the ARQ feedback controller 921 determines whether to poll ARQ feedback based on a size of an ARQ window. In another example, the ARQ feedback controller 921 may determine whether to poll ARQ feedback based on a lifetime for an ARQ block and a storage or non-storage of the ARQ block.

The transmit apparatus 930 includes a message constructor 931 and a transmitter 933.

The message constructor 931 constructs a control message including ARQ feedback polling information and ARQ feedback lifetime information or ARQ feedback transmission time point information, which is determined in the ARQ feedback controller 921. For example, the message constructor 931 constructs an extended header, which includes ARQ feedback polling information and ARQ feedback lifetime information or ARQ feedback transmission time point information, in a format as illustrated in FIG. 8A or 8B. In another example, the message constructor 931 may construct a control message of a MAC layer, which includes ARQ feedback polling information and ARQ feedback lifetime information or ARQ feedback transmission time point information, in a format as illustrated in FIG. 8C or 8D.

The transmitter 933 converts transmission data and the control message constructed in the message constructor 931 into a high frequency signal, and transmits the high frequency signal to the duplexer 900. For example, the transmitter 933 may include a channel encoding block, a modulating block, an RF processing block and the like. The channel encoding block may include a channel encoder, an interleaver, a modulator, and the like. In a case of an Orthogonal Frequency Division Multiplexing (OFDM) system, the modulating block may include an Inverse Fast Fourier Transform (IFFT) operator for loading transmission data and a control message on a plurality of orthogonal subcarriers, and the like. On the other hand, in a case of a Code Division Multiple Access (CDMA) system, the modulating block may include a code spreading modulator. The RF processing block converts a baseband signal provided from the modulating block into a high frequency signal, and transmits the high frequency signal to the duplexer 900.

In the aforementioned construction, the ARQ controller 920 may include the ARQ feedback controller 921.

The following description is made for an exemplary construction of a receive end for transmitting ARQ feedback information according to ARQ feedback polling of a transmit end.

Figure 10:
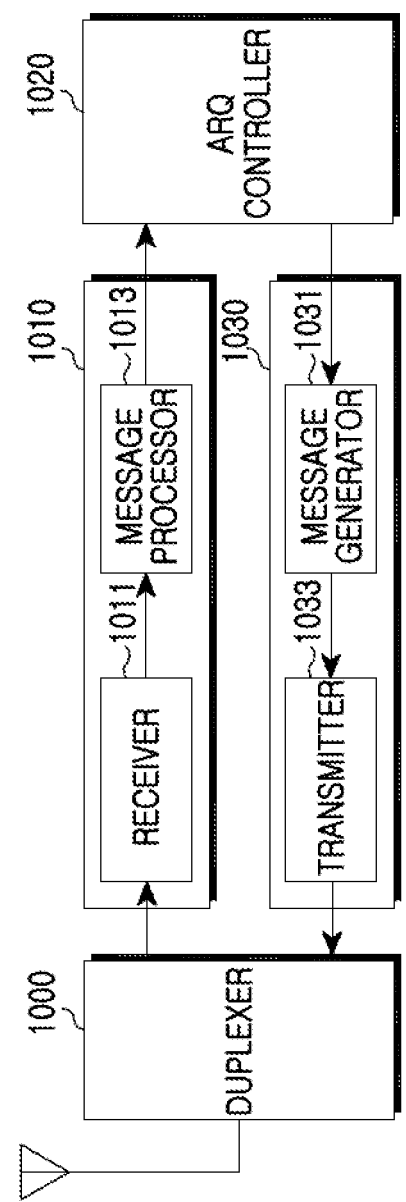
FIG. 10 is a block diagram illustrating a construction of a receive end in a wireless communication system according to an exemplary embodiment of the present invention.

FIG. 10 is a block diagram illustrating a construction of a receive end in a wireless communication system according to an exemplary embodiment of the present invention.

Referring to FIG. 10, a receive end includes a duplexer 1000, a receive apparatus 1010, an ARQ controller 1020, and a transmit apparatus 1030.

According to a duplexing scheme, the duplexer 1000 transmits a transmit signal provided from the transmit apparatus 1030 through an antenna, and provides a receive signal from the antenna to the receive apparatus 1010. For example, in a case of a TDD scheme, the duplexer 1000 transmits a transmit signal provided from the transmit apparatus 1030 through the antenna during a transmission duration, and the duplexer 1000 provides a receive signal from the antenna to the receive apparatus 1010 during a reception duration.

The receive apparatus 1010 converts a high frequency signal provided from the duplexer 1000 into a baseband signal. The receive apparatus 1010 demodulates and decodes the baseband signal. For example, the receive apparatus 1010 may include an RF processing block, a demodulating block, a channel decoding block, and the like. The RF processing block converts a high frequency signal received through the antenna into a baseband signal. The demodulating block may include an FFT operator for extracting data loaded on each subcarrier from a signal provided from the RF processing block, and the like. The channel decoding block may include a demodulator, a de-interleaver, a channel decoder, and the like.

The ARQ controller 1020 controls ARQ with a transmit end. For example, in a case where an error occurs in data received from the transmit end, the ARQ controller 1020 controls to transmit NACK information to the transmit end. In another example, in a case where an error does not occur in data received from the transmit end, the ARQ controller 1020 controls to transmit ACK information to the transmit end.

At this time, the ARQ controller 1020 controls to transmit ARQ feedback information based on an ARQ feedback lifetime or ARQ feedback transmission time point received from the transmit end. For example, in a case based on an ARQ feedback lifetime, the ARQ controller 1020 controls to transmit ARQ feedback information within the ARQ feedback lifetime. In a case where there is a signal transmitted to the transmit end within the ARQ feedback lifetime, the ARQ controller 1020 may control to include ARQ feedback information in the signal and transmit the signal including the ARQ feedback information. In another example, in a case based on an ARQ feedback transmission time point, the ARQ controller 1020 controls to transmit ARQ feedback information at the ARQ feedback transmission time point. In a case where there is a signal transmitted to the transmit end at the ARQ feedback transmission time point, the ARQ controller 1020 may control to include ARQ feedback information in the signal and transmit the signal including the ARQ feedback information.

The transmit apparatus 1030 includes a message generator 1031 and a transmitter 1033.

The message generator 1031 generates ARQ feedback information according to control of the ARQ controller 1020. For example, in a case where an error occurs in data received from a transmit end, the message generator 1031 generates NACK information. On the other hand, in a case where an error does not occur in data received from the transmit end, the message generator 1031 generates ACK information.

The transmitter 1033 converts transmission data and the control message generated in the message generator 1031 into a high frequency signal, and transmits the high frequency signal to the duplexer 1000. For example, the transmitter 1033 may include a channel encoding block, a modulating block, an RF processing block and the like. The channel encoding block may include a channel encoder, an interleaver, a modulator, and the like. In a case of an OFDM system, the modulating block may include an IFFT operator for loading transmission data and a control message on a plurality of orthogonal subcarriers, and the like. On the other hand, in a case of a CDMA system, the modulating block may include a code spreading modulator. The RF processing block converts a baseband signal provided from the modulating block into a high frequency signal, and transmits the high frequency signal to the duplexer 1000.

As described above, exemplary embodiments of the present invention have an advantage in which, by setting an ARQ feedback lifetime or ARQ feedback transmission time point and polling ARQ feedback to a receive end in a transmit end of a wireless communication system, the transmit end may recognize a time point when ARQ feedback information is received from the receive end.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A method for Automatic Repeat reQuest (ARQ) feedback polling in a transmit end of a wireless communication system, the method comprising:

transmitting at least one ARQ block to a receive end;

polling ARQ feedback to the receive end using an extended header;

allocating to the receive end a resource;

determining if ARQ feedback information is received from the receive end within a lifetime of ARQ feedback using the allocated resource information;

if it is determined that the ARQ feedback information is received within the lifetime of ARQ feedback, determining at least one of success and failure of transmission of the at least one ARQ block through the ARQ feedback information; and if it is determined that the ARQ feedback information is not received within the lifetime of ARQ feedback, polling ARQ feedback again to the receive end.

2. The method of claim 1, further comprising, before the transmitting of the at least one ARQ block to the receive end, in a case of at least one of an initial access and a data service parameter determination with the receive end, determining the lifetime of ARQ feedback for the receive end.

3. The method of claim 2, wherein the data service parameter determination is a Dynamic Service Addition (DSA).

4. The method of claim 1, further comprising, before the transmitting of the at least one ARQ block to the receive end and the polling of the ARQ feedback, determining the lifetime of ARQ feedback for the receive end.

5. The method of claim 1, wherein the allocating to the receive end a resource comprises, in a case where the receive end polls a resource for ARQ feedback, allocating to the receive end a resource for ARQ feedback.

6. The method of claim 1, wherein the extended header comprises service connection IDentifier (ID) information polling ARQ feedback and ARQ feedback polling information, and wherein the ARQ feedback polling information is represented as a type of the extended header.

7. An apparatus for Automatic Repeat reQuest (ARQ) feedback polling in a transmit end of a wireless communication system, the apparatus comprising:

a transmit apparatus for transmitting at least one ARQ block to a receive end;

a receive apparatus for receiving a signal; and an ARQ controller for, after polling ARQ feedback to the receive end through the transmit apparatus, determining at least one of success and failure of transmission of the at least one ARQ block through the ARQ feedback information in a case where ARQ feedback information is received from the receive end through the receive apparatus within a lifetime of ARQ feedback, and for polling ARQ feedback again to the receive end in a case where the ARQ feedback information is not received within the lifetime of ARQ feedback, wherein the transmit apparatus polls ARQ feedback to the receive end using an extended header, wherein the ARQ controller allocates to the receive end a resource.

8. The apparatus of claim 7, further comprising an ARQ feedback controller for determining the lifetime of ARQ feedback for the receive end in a case of at least one of an initial access and a data service parameter determination with the receive end.

9. The apparatus of claim 7, further comprising an ARQ feedback controller for determining the lifetime of ARQ feedback for the receive end when polling ARQ feedback.

10. The apparatus of claim 7, wherein the ARQ controller allocates the receive end a resource for ARQ feedback in a case where the receive end polls a resource for ARQ feedback.

11. The apparatus of claim 7, wherein the extended header comprises service connection IDentifier (ID) information polling ARQ feedback and ARQ feedback polling information, and
wherein the ARQ feedback polling information is represented as a type of the extended header.

12. A method for Automatic Repeat reQuest (ARQ) feedback polling in a transmit end of a wireless communication system, the method comprising:
transmitting at least one ARQ block to a receive end;
polling ARQ feedback to the receive end using an extended header;
allocating to the receive end a resource;
determining if ARQ feedback information is received from the receive end at an ARQ feedback transmission time point of the receive end using the allocated resource information;
if it is determined that the ARQ feedback information is received at the ARQ feedback transmission time point of the receive end, determining at least one of success and failure of transmission of the at least one ARQ block through the ARQ feedback information; and
if it is determined that the ARQ feedback information is not received at the ARQ feedback transmission time point of the receive end, polling ARQ feedback again to the receive end.

13. The method of claim 12, further comprising, before the transmitting of the at least one ARQ block to the receive end, in a case of at least one of an initial access and a data service parameter determination with the receive end, determining the ARQ feedback transmission time point of the receive end.

14. The method of claim 13, wherein the data service parameter determination is a Dynamic Service Addition (DSA).

15. The method of claim 12, further comprising, before the transmitting of the at least one ARQ block to the receive end and the polling of the ARQ feedback, determining the ARQ feedback transmission time point of the receive end.

16. The method of claim 12, wherein the extended header comprises service connection IDentifier (ID) information polling ARQ feedback and ARQ feedback polling information, and
wherein the ARQ feedback polling information is represented as a type of the extended header.

17. An apparatus for Automatic Repeat reQuest (ARQ) feedback polling in a transmit end of a wireless communication system, the apparatus comprising:
a transmit apparatus for transmitting at least one ARQ block to a receive end;
a receive apparatus for receiving a signal; and
an ARQ controller for, after polling ARQ feedback to the receive end through the transmit apparatus, determining at least one of success and failure of transmission of the at least one ARQ block through the ARQ feedback information in a case where ARQ feedback information is received from the receive end through the receive apparatus at an ARQ feedback transmission time point of the receive end, and for polling ARQ feedback again to the receive end in a case where the ARQ feedback information is not received at the ARQ feedback transmission time point of the receive end,
wherein the transmit apparatus polls ARQ feedback to the receive end using an extended header, and
wherein the ARQ controller allocates to the receive end a resource.

18. The apparatus of claim 17, further comprising an ARQ feedback controller for determining the ARQ feedback transmission time point of the receive end in a case of at least one of initial access and a data service parameter determination with the receive end.

19. The apparatus of claim 17, further comprising an ARQ feedback controller for determining the ARQ feedback transmission time point of the receive end when polling ARQ feedback.

20. The apparatus of claim 17, wherein the extended header comprises service connection IDentifier (ID) information polling ARQ feedback and ARQ feedback polling information, and
wherein the ARQ feedback polling information is represented as a type of the extended header.

* * * * *